(12) United States Patent
Bahk et al.

(10) Patent No.: US 11,510,101 B2
(45) Date of Patent: Nov. 22, 2022

(54) DEVICE AND METHOD FOR OPERATING NETWORK IN WIRELESS COMMUNICATION SYSTEM

(71) Applicants: Samsung Electronics Co., Ltd., Suwon-si (KR); SEOUL NATIONAL UNIVERSITY R&DB FOUNDATION, Seoul (KR)

(72) Inventors: Saewoong Bahk, Seoul (KR); Kitaek Lee, Seoul (KR); Jihwan Lee, Seoul (KR)

(73) Assignees: Samsung Electronics Co., Ltd., Suwon-si (KR); Seoul National University R&DB Foundation, Seoul (KR)

(*) Notice: Subject to any disclaimer, the term of this patent is extended or adjusted under 35 U.S.C. 154(b) by 0 days.

(21) Appl. No.: 17/444,373

(22) Filed: Aug. 3, 2021

(65) Prior Publication Data

US 2022/0046474 A1 Feb. 10, 2022

(30) Foreign Application Priority Data

Aug. 4, 2020 (KR) .................. 10-2020-0097338

(51) Int. Cl.
*H04W 28/08* (2009.01)
(52) U.S. Cl.
CPC ... *H04W 28/0812* (2020.05); *H04W 28/0875* (2020.05); *H04W 28/0967* (2020.05)

(58) Field of Classification Search
CPC ......... H04W 28/0812; H04W 28/0875; H04W 28/0967; H04W 24/02; H04W 4/40; H04W 24/08; H04W 84/005; H04W 92/20
See application file for complete search history.

(56) References Cited

U.S. PATENT DOCUMENTS

| 2006/0256756 | A1* | 11/2006 | Wakabayashi | .... H04W 72/1226 370/335 |
| 2013/0121155 | A1* | 5/2013 | Agarwal | .......... H04W 28/0808 370/236 |
| 2018/0035391 | A1 | 2/2018 | Neves et al. | |
| 2021/0051448 | A1* | 2/2021 | Jung | ................. H04W 28/0268 |

FOREIGN PATENT DOCUMENTS

CN 107409329 A * 11/2017 ............ H04W 16/14

* cited by examiner

*Primary Examiner* — Ahmed Elallam

(57) ABSTRACT

A method by a first base station comprises receiving a message including information related to a sum of traffic loads of user equipment and information related to a location of a second base station from second base stations, identifying a sum of traffic loads transmitted from the second base stations, to the UEs, identifying whether the identified sum of the traffic loads is larger than a sum of data rates for the corresponding UEs of the corresponding second base stations located in the specific first area, when the identified sum of the traffic loads is larger than the sum of the data rates, identifying a specific UE to be operated as a second base station among the corresponding UEs located in the specific first area, and transmitting information indicating that the specific UE is to operate as the second base station to the specific UE.

20 Claims, 8 Drawing Sheets

| Network optimization method | Centralized method | Distributed method | Hybrid optimization method |
|---|---|---|---|
| Entity to determine network optimization | Macro base station | Vehicle operating as small base station | Macro base station + vehicle operating as small base station |

DEVICE AND METHOD FOR OPERATING NETWORK IN WIRELESS COMMUNICATION SYSTEM

CROSS-REFERENCE TO RELATED APPLICATION

This application is based on and claims priority under 35 U.S.C. 119 to Korean Patent Application No. 10-2020-0097338 filed on Aug. 4, 2020 in the Korean Intellectual Property Office, the disclosure of which is herein incorporated by reference in its entirety.

BACKGROUND

1. Field

The disclosure relates to a device and method for operating a network in a wireless communication system, and more particularly, to a device and method for operating an ultra-high density network based on a mobile base station.

2. Description of Related Art

Wireless communication technologies have been developed mainly for human services, such as voice, multimedia, and data communication. As 5th-generation (5G) communication systems become commercially available, connected devices are expected to explosively increase and to be connected to a communication network. Examples of things connected to a network may include vehicles, robots, drones, home appliances, displays, smart sensors installed in various infrastructures, construction machinery, and factory equipment. Mobile devices will evolve into various form factors, such as augmented reality glasses, virtual reality headsets, and hologram devices. In the 6th-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (μsec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz bands (e.g., 95 gigahertz (95 GHz) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and a reconfigurable intelligent surface (RIS), are being discussed to enhance the coverage of the terahertz band signals.

For 6G communication systems to enhance frequency efficiency and system network for 6G communication systems to include full-duplex technology, there are being developed full-duplex technology in which uplink (UE transmission) and downlink (base station transmission) simultaneously utilize the same frequency resource at the same time, network technologies that comprehensively use satellite and high-altitude platform stations (HAPSs), network architecture innovation technology that enables optimization and automation of network operation and supports mobile base stations, dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the UE computation capability by ultra-high performance communication and mobile edge computing (MEC) or clouds. Further, continuous attempts have been made to reinforce connectivity between devices, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

As described above, a need exists for a scheme for efficiently operating base stations in a wireless communication system.

SUMMARY

The present disclosure provides embodiments of a method and device for operating a network in a wireless communication system.

The present disclosure provides embodiments of a method for operating an ultra-high density network based on a mobile base station in a wireless communication system.

The present disclosure provides embodiments of a method and device for operating an ultra-high density network to efficiently add or change a mobile base station in a wireless communication system.

The present disclosure provides embodiments of a method and device for efficiently operating base stations based on the context of operating an ultra-high density network in a wireless communication system.

In accordance with some embodiments, a method by a first base station in a wireless communication system comprises receiving a message including information related to a sum of traffic loads of corresponding user equipment's (UEs) and information related to a location of a corresponding second base station from each of second base stations, identifying a sum of traffic loads transmitted from corresponding second base stations, located in a specific first area among first areas included in a service area of the first base station, to corresponding UEs, identifying whether the identified sum of the traffic loads is larger than a sum of data rates for the corresponding UEs of the corresponding second base stations located in the specific first area, when the identified sum of the traffic loads is larger than the sum of the data rates, identifying a specific UE to be operated as a second base station among the corresponding UEs located in the specific first area, and transmitting information indicating that the specific UE is to operate as the second base station to the specific UE.

In accordance with various embodiments, a method by a user equipment (UE) in a wireless communication system comprises, when a specific second base station among second base stations connected with the UE meets a configuration condition, identifying the specific second base station as a malfunctioning second base station and transmitting information indicating that the specific second base station is the malfunctioning second base station to a second base station other than the specific second base station among the second base stations, wherein the configuration condition includes a condition where a data rate of data received by the UE through the specific second base station is less than a threshold.

In accordance with certain embodiments, a method by a user equipment (UE) in a wireless communication system comprises receiving first information from a first base station while operating as a normal UE in a normal UE operation mode, the first information indicating that the UE is to be operated as a second base station directly transmitting/receiving data to/from the first base station via a backhaul link, switching from the normal UE operation mode to a base station operation mode based on the first information, receiving second information from the first base station while operating as the second base station in the base station operation mode, the second information indicating that the UE is to operate as the normal UE, and switching from the base station operation mode to the normal UE operation mode based on the second information.

In accordance with some embodiments, a first base station in a communication system comprises a controller configured to identify a sum of traffic loads transmitted from corresponding second base stations, located in a specific first area among first areas included in a service area of the first base station, to corresponding UEs, identify whether the identified sum of the traffic loads is larger than a sum of data rates for the corresponding UEs of the corresponding second base stations located in the specific first area and, when the identified sum of the traffic loads is larger than the sum of the data rates, identify a specific UE to be operated as a second base station among the corresponding UEs located in the specific first area and a transceiver configured to receive a message including information related to a sum of traffic loads of corresponding user equipment's (UEs) and information related to a location of a corresponding second base station from each of second base stations and transmit information indicating that the specific UE is to operate as the second base station to the specific UE.

In accordance with certain embodiments, a UE in a communication system comprises a controller configured to, when a specific second base station among second base stations connected with the UE meets a configuration condition, identify the specific second base station as a malfunctioning second base station and a transceiver configured to transmit information indicating that the specific second base station is the malfunctioning second base station to a second base station other than the specific second base station among the second base stations, wherein the configuration condition includes a condition where a data rate of data received by the UE through the specific second base station is less than a threshold.

In accordance with various embodiments, a UE in a wireless communication system comprises a controller configured to, upon receiving first information from a first base station while operating as a normal UE in a normal UE operation mode, the first information indicating that the UE is to be operated as a second base station directly transmitting/receiving data to/from the first base station via a backhaul link, switch the operation mode from the normal UE operation mode to a base station operation mode and, upon receiving second information from the first base station while operating as the second base station in the base station operation mode, the second information indicating that the UE is to operate as the normal UE, switch the operation mode from the base station operation mode to the normal UE operation mode and a transceiver configured to transmit/receive the first information and the second information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
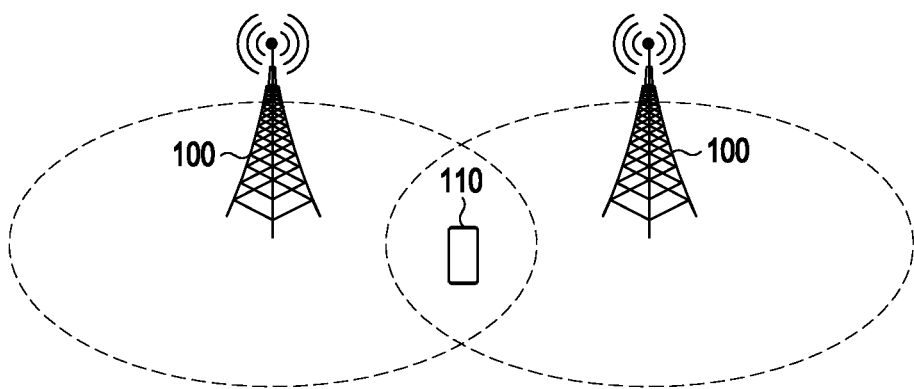
FIG. 1 illustrates an example of a base station operation model used in a communication system according to various embodiments.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described with reference to the accompanying drawings. However, it should be appreciated that the disclosure is not limited to the embodiments, and all changes and/or equivalents or replacements thereto also belong to the scope of the disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Prior to describing various embodiments of the disclosure, the transmitter as used in the disclosure may be any one of a base station (BS), a node B, an evolved node B (eNB), or a next-generation node B.

Further, the transmitter as used in the disclosure may be any one of a terminal, a user equipment (UE) or a mobile station (MS). Further, the transmitter may be an electronic device which may come in various types. According to an embodiment, the electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

Prior to describing various embodiments of the disclosure, the receiver as used in the disclosure may be any one of a base station, a node B, an evolved node B, or a next-generation node B.

The receiver as used in the disclosure may be any one of a terminal, a user equipment (UE) or a mobile station (MS). Further, the receiver may be an electronic device which may come in various types. According to an embodiment, the electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

FIG. 1 illustrates an example of a base station operation model used in a communication system according to various embodiments.

Referring to the illustrative example of FIG. 1, in a communication system, a base station 100 is installed in a fixed place and provides services to a user equipment (UE) 110 in service coverage, e.g., a cell.

An ultra-high density network is a network designed considering base stations currently arranged in fixed locations. However, arranging a plurality of base stations in fixed locations may be a factor that hinders efficient ultra-high density network operation. This is because, when a plurality of base stations are densely arranged, some base stations may be unnecessary due to data traffic that changes according to time and space, and an overload of data traffic may occur in a specific base station.

Accordingly, an ultra-high density network based on base stations arranged in fixed locations may cause inefficient operations in terms of energy and cost efficiency. Further, since all the base stations are installed in fixed locations, when a specific user UE or a group of user UEs suffers severe signal attenuation by a specific base station by an obstacle, such as a building in a complex urban environment, the quality of service (QoS) for the user UE or user UE group may be sharply degraded.

According to various embodiments, there is proposed a method for operating an ultra-high density network considering not only base stations installed in fixed locations, but also mobile base stations, e.g., vehicle base stations. Here, the vehicle base station may operate as a UE or a base station if necessary. When the vehicle base station operates as a UE, the vehicle base station operates as a UE transmitting/receiving data under the control of a macro base station (or master base station) or small base station (or slave base station) connected with the vehicle base station, as does a normal UE.

In contrast, when the vehicle base station operates as a base station, the vehicle base station connects to the macro base station via a backhaul link and operates as a small base station for other UEs, as does the small base station.

According to various embodiments, there are also proposed various methods for efficiently operating an ultra-high density network based on vehicle base stations. As an example, according to an embodiment, there is proposed a method for determining whether to control vehicle base stations, which are included in an ultra-high density network, to operate as small base stations or as normal UEs considering the traffic of UEs.

According to some embodiments, an ultra-high density network structure in which a base station may exist in a place where UEs are located so as to prevent QoS from being degraded due to signal attenuation by obstacles, which may be frequent in a complex urban environment, has been proposed.

According to certain embodiments, there is proposed a method for maintaining, e.g., light of sight (hereinafter, simply "LoS") for UEs via a mobile base station so as to render it possible for a base station to exist in a place where UEs are located.

Although various embodiments focus primarily on the scenario where vehicles in an urban environment are employed as mobile base stations, embodiments of the disclosure are not limited thereto, and any other various devices, pieces of equipment, or means than vehicles may also be used as such mobile base stations.

Figures 2, 3:
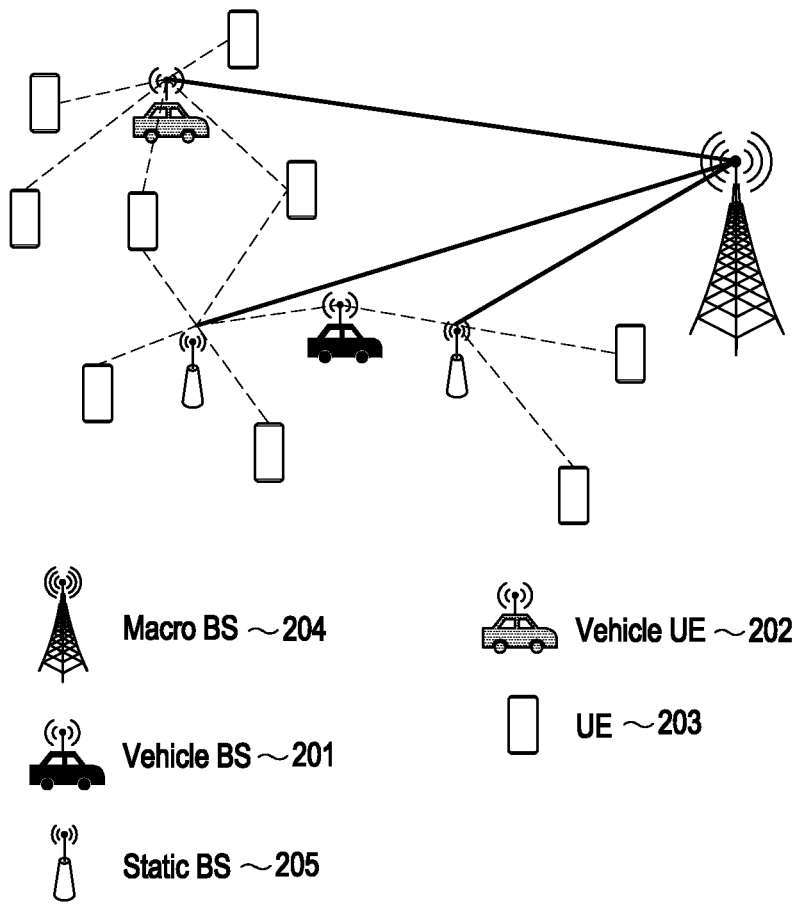
FIG. 2 illustrates an example a vehicle base station used in a communication system according to certain embodiments.
FIG. 3 illustrates operations of an example method for operating an ultra-high density network based on vehicle base stations in a communication system according to some embodiments.

FIG. 2 illustrates aspects of an example of a vehicle base station used in a communication system according to certain embodiments.

Referring to the illustrative example of FIG. 2, according to some embodiments, of a vehicle base station may meet the QoS for multiple UEs and the mobility of the vehicle base station when a vehicle is used as a mobile base station. Also proposed herein are a method for adding, changing, or removing a base station in a vehicle base station-based network and a method for selecting a vehicle base station.

First described is a method for operating an ultra-high density network using vehicle-based mobile base stations according to an embodiment. Referring to FIG. 2, a vehicle 201 may be configured to operate as both a UE and a base station. In both the case where the vehicle operates as a UE and the case where the vehicle operates as a base station, the vehicle requires data from a server. When the vehicle operates as a base station, the vehicle sends a request for its own data and data of another vehicle 202 used only as a UE to a macro base station 204. The vehicle 202 operating only as a UE may be directly connected with the macro base station and receive data through an access link connected with a small base station 205. A UE 203 operates as a user-centric network that is simultaneously connected with multiple base stations. The UE or the vehicle operating only as a UE has a network structure 200 in which it is simultaneously connected with multiple small base stations. In other words, the UE 203 has a structure in which it may connect with multiple small base stations via access links, and the base station 204 may provide network services to multiple UEs.

FIG. 3 illustrates aspects of a method for operating an ultra-high density network based on vehicle base stations in a communication system according to various embodiments.

Referring to the illustrative example of FIG. 3, a method for optimizing a vehicle base station-based network in a communication system may vary depending on the entity that determines network optimization. As an example, vehicle base station-based network optimization methods may be divided into a centralized method, a distributed method, and a hybrid optimization method depending on entities that determine network optimization.

First described is the centralized method.

The centralized method is a network optimization method when the entity that determines network optimization is a macro base station. As an example, the macro base station determines whether to exchange some of the current vehicle base stations with other vehicle base stations, whether to stop some of the current vehicle base stations from operating as small base stations, and whether to add new vehicle base stations other than the currently operated vehicle base stations, based on measurement reports transmitted from multiple small base stations. According to an embodiment, the measurement report transmitted from the small base station may include the reference signal received power (RSRP) for the reference signal received from the macro base station by the small base station, and parameters included in the measurement report may be any parameters that may indicate the channel quality between the small base station and the macro base station.

According to various embodiments, in the centralized method, the macro base station may determine whether to operate with other new vehicle base stations than those being currently operated.

According to some embodiments, in the centralized method, the macro base station may determine whether to change the area of arrangement where the vehicle base stations are currently being operated.

According to certain embodiments, in the centralized method, the macro base station may determine whether to stop operating other new vehicle base stations than the vehicle base stations being currently operated.

According to some embodiments, in the centralized method, the macro base station may determine whether to deprive vehicle base stations, which are being currently operated, of their role and allow them to operate as normal UEs, e.g., when it is determined that there is a malfunction in the vehicle base stations.

A second, distributed method is described below.

The distributed method is a network optimization method when the entity to determine network optimization is a vehicle currently operating as a small base station. In the distributed method, the vehicle currently operating as a small base station, itself, may determine whether to continue to operate as the small base station or operate as a UE. In other words, in the distributed method, the vehicle itself may determine whether to operate as a small base station or as a UE, if necessary.

According to some embodiments, in the distributed method, a vehicle currently operating as a small base station may itself determine whether to continue to operate as the small base station or operate as a UE.

According to certain embodiments, in the distributed method, the vehicle currently operating as a small base station, may itself determine whether to continue to operate as the small base station or operate as a UE when it is determined that the vehicle base station has a malfunction.

A third, hybrid optimization method is described below.

The hybrid optimization method may be a hybrid of the centralized method and the distributed method. In other words, in the hybrid optimization method, the entity to determine network optimization may be either the macro base station or the vehicle currently operating as a small base station.

According to certain embodiments, the vehicle currently operating as a small base station may stop operating as the small base station and operate as a normal UE when the performance of the access link between the vehicle and the UE connected with the vehicle or the backhaul link between the vehicle and the macro base station is degraded.

According to various embodiments, the macro base station may transmit information for requesting to add a new small base station or to stop vehicle base stations, which need not operated as small base stations, among the existing vehicle base stations, from operating as small base stations and operate as UEs based on periodic measurement reports received from multiple small base stations.

According to some embodiments, the macro base station may determine whether to newly add a vehicle to operate as a small base station when the traffic load of the actual transmissions from the small base station via the access link is smaller than the data rate required by the UE in the area where the macro base station operates the network.

According to an embodiment, when the macro base station determines to newly add a vehicle to operate as a small base station, if areas in which the traffic load of actual transmissions from the small base station via the access link is smaller than the data rate required by the UE are more than the number of backhaul links that may be allocated by the macro base station, the macro base station determine whether to change the area of arrangement of the vehicle currently operating as a small base station.

According to an embodiment, the vehicle currently operating as a small base station, may itself determine whether to operate as a normal UE when the data rate of transmitted from the macro base station through the backhaul link is less than a specific value.

According to an embodiment, the vehicle currently operating as a small base station, may itself determine whether to operate as a normal UE, upon determining a malfunction in the vehicle currently operating as a small base station.

According to an embodiment, upon determining a malfunction in the vehicle currently operating as a small base station, the macro base station may determine whether to deprive the vehicle currently operating as a small base station of the role as a base station and operate it as a normal UE.

According to an embodiment, protocols for optimizing a vehicle base station-based ultra-high density network may be divided into protocol stages, including: 1) a protocol to determine to arrange a new vehicle base station; 2) a protocol to select a new vehicle base station; 3) a protocol to change the area of arrangement of a vehicle base station; 4) a protocol to stop the operation of an existing vehicle base station; and 5) a protocol to prevent a malfunction in a vehicle base station.

Figure 4:
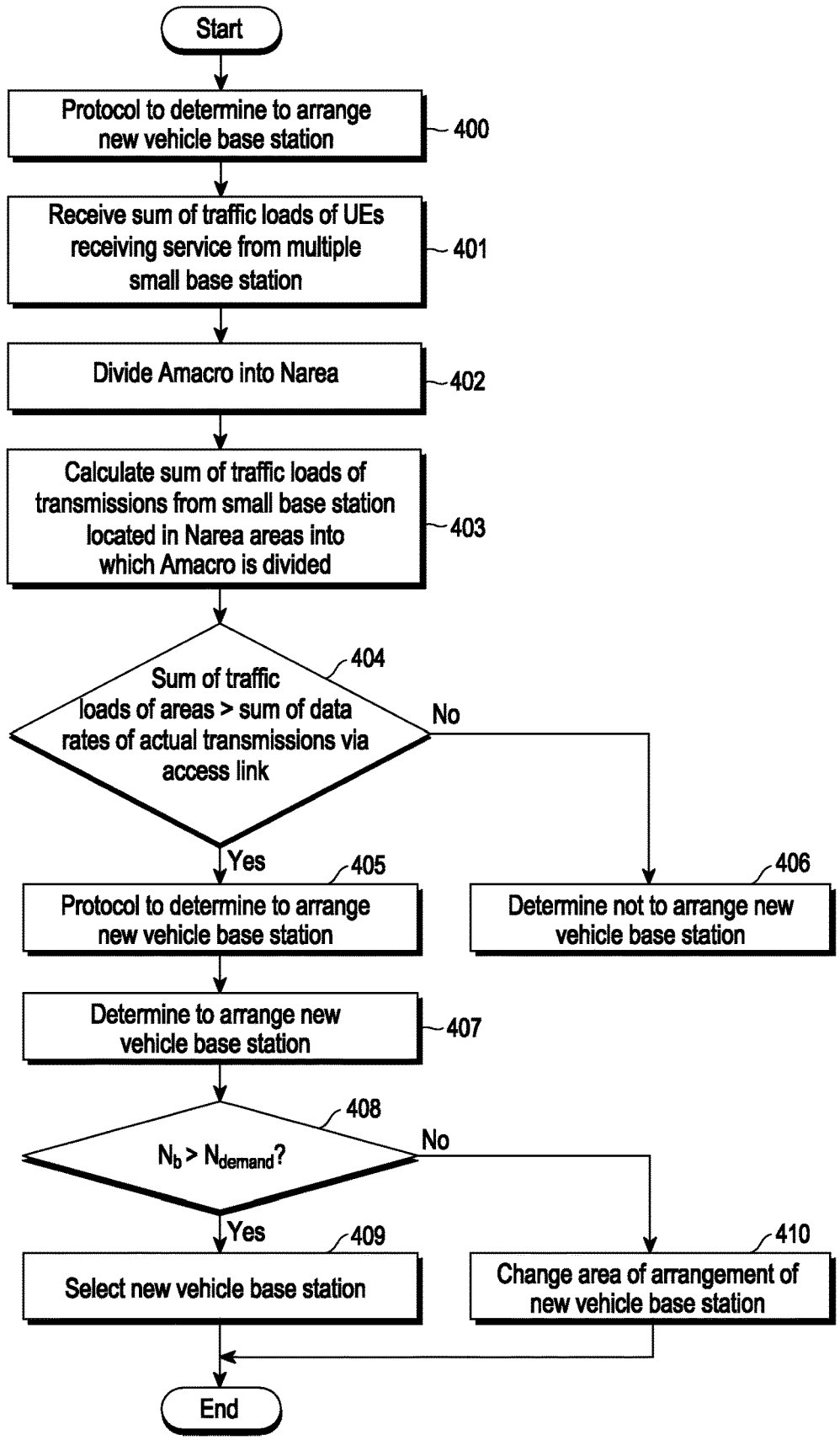
FIG. 4 illustrates operations of an example method for determining to arrange a new vehicle base station as part of a method for operating the optimization of an ultra-high density network based on vehicle base stations in a communication system according to various embodiments.

FIG. 4 illustrates operations of an example method for determining to arrange a new vehicle base station as part of a method for operating the optimization of an ultra-high density network based on vehicle base stations in a communication system according to certain embodiments of this disclosure.

Referring to the illustrative example of FIG. 4, a method for determining to arrange a new vehicle base station as illustrated in FIG. 4 is based on the hybrid optimization method and may be a method for determining to arrange a new vehicle base station when the entity to determine network optimization is the macro base station.

The entire service area covered by the macro base station is defined as $A_{macro}$, and the number of sub service areas each of which has a predetermined size and into which the entire service area is divided is defined as $N_{area}$. The number of service areas in which the sum of the data rates required by UEs gets larger is defined as $N_{demand}$. The number of backhaul links that may be allocated by the macro base station is defined as $N_b$.

At block 401, each of the multiple small base stations transmits the sum of traffic loads of UEs to which each of the multiple small base stations is currently providing services to the macro base station. The macro base station receives the sum of the traffic loads of the UEs to which each of the multiple small base stations is currently providing services from each of the multiple small base stations. The macro base station may determine whether to arrange an additional vehicle base station based on the traffic load of each small base station and the location of each small base station.

According to various embodiments, at block 402, the macro base station divides the entire service area $A_{macro}$ into $N_{area}$. By dividing $A_{macro}$ into $N_{area}$, each sub service area, which has a uniform size resulting from dividing the area in which the macro base station is in charge of the operation of the network into $N_{area}$, is identified. According to various embodiments, at block 403, the macro base station calculates the sum of traffic loads that the small base stations located in the sub service areas transmit to the UEs present in the sub service areas.

According to various embodiments, at block 404, a determination of whether the sum of the traffic loads received from the small base stations located in the sub service areas is larger than the sum of the data rates of the actual transmissions from the macro base station via the access link is performed When, at block 404 the macro base station determines that the sum of the traffic loads received from the small base stations is larger than the sum of the data rates, the method proceeds to block 404, where protocol to add a new vehicle base station is initiated. Otherwise, the method terminates at block 406, wherein a new vehicle base station is not added.

When it is determined to arrange a new vehicle base station at block 407, a further determination as to whether $N_b$ is larger than $N_{demand}$ is performed at block 408. In a case where $N_b$ is determined to be larger than $N_{demand}$ operation proceeds to block 409, where the macro base station selects a new vehicle base station. If, at block 408, $N_b$ is determined to be smaller than $N_{demand}$ (408), the area of arrangement of the vehicle base station is changed at block 410.

In other words, when $N_b$ is larger than $N_{demand}$, the macro base station selects a new vehicle base station in the sub service area in which the sum of the traffic loads received from the small base stations located in the sub service areas is larger than the sum of the data rates of the actual transmissions from the macro base station via the access link, from among the multiple sub service areas (as shown by block 409). A method for selecting a new vehicle base station is described below in detail in FIG. 5.

When $N_b$ is smaller than $N_{demand}$, the macro base station changes all of the UEs currently operating as vehicle base stations into normal UEs and then arranges new vehicle base stations in order of sub service area from the highest demand for data rate to the smallest. A method for changing the area of arrangement of the vehicle base station is described below in detail in FIG. 6.

Figure 5:
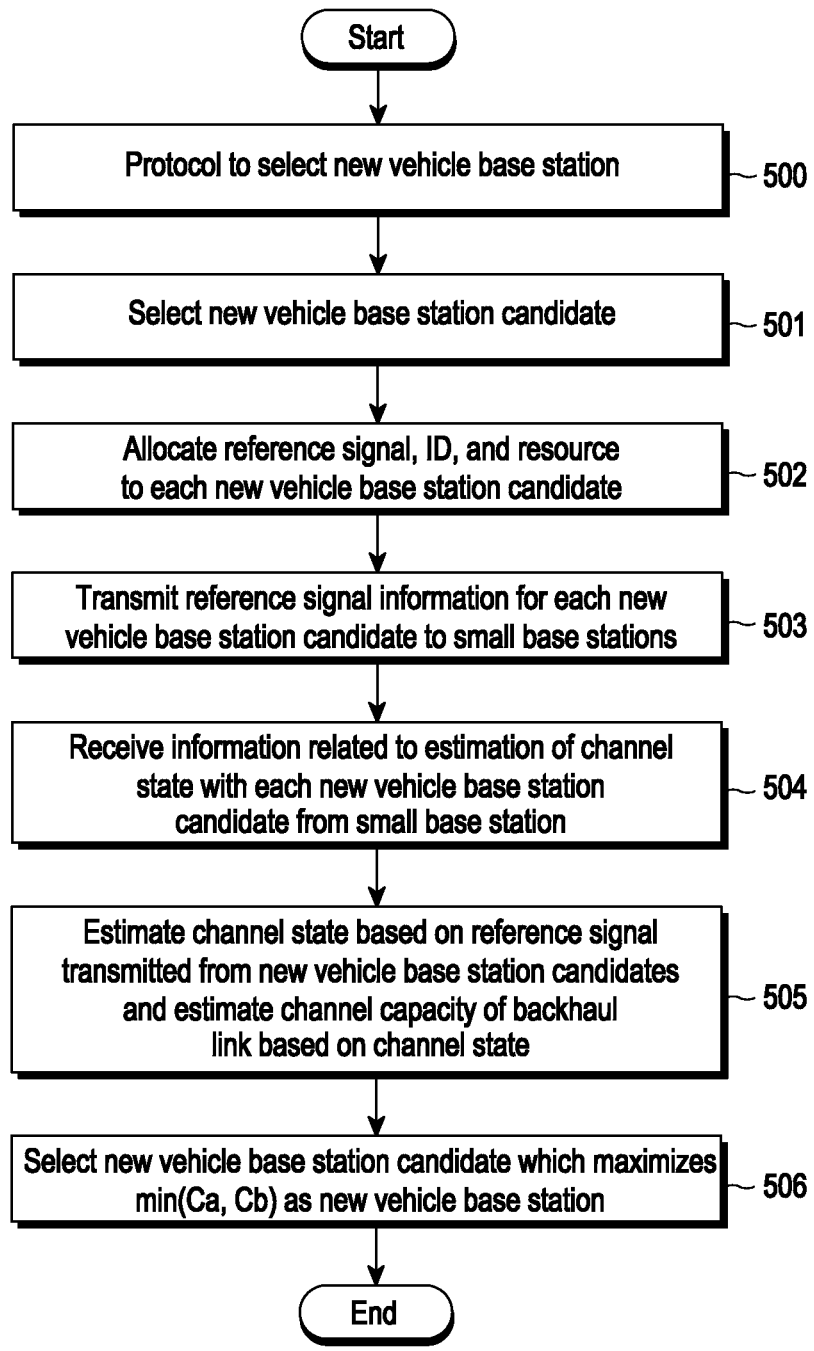
FIG. 5 illustrates operations of an example method for selecting a new vehicle base station as part of a method for optimizing an ultra-high density network based on vehicle base stations in a communication system according to some embodiments.

FIG. 5 illustrates operations of an example method for selecting a new vehicle base station in a method for optimizing an ultra-high density network based on vehicle base stations in a communication system according to an embodiment.

Referring to the illustrative example of FIG. 5, a method for selecting a new vehicle base station based on the hybrid optimization method is shown in the figure. The illustrated method may be a protocol for selecting a new vehicle base station when the entity to determine network optimization is the macro base station (block 500).

Vehicle UEs around the UE whose QoS has been lowered due to the deterioration of the access link performance of the ambient small base station or the deterioration of the backhaul link between the ambient small base station and the macro base station are selected as new vehicle base station candidates (block 501). According to certain embodiments, as an example, vehicles located near UEs which do not meet the QoS may be selected as vehicle base station candidates, and vehicles connected with the small base station maintaining connection with the UEs may be selected as new vehicle base station candidates.

The macro base station allocates orthogonal reference signals to the new vehicle base station candidates while allocating time and frequency resources for transmission of the reference signals. For example, the reference signal may be used for channel estimation. The macro base station allocates different reference signal identifications (Ids) to the new vehicle base station candidates (block 502). Upon performing the operation of selecting a new vehicle base station based on information about a reference signal set, the macro base station allocates the same number of reference signals as the number of new vehicle base station candidates to the new vehicle base station candidates (block 502). The macro base station transmits the reference signal information allocated to the new vehicle base station candidates to the small base stations preset around the new vehicle base station candidates (block 503). Each new vehicle base station candidate transmits the allocated reference signal to the small base station using the time and frequency resources allocated by the macro base station. Upon receiving the reference signal, the small base station derives the channel state of each of the new vehicle base station candidates (block 504). According to various embodiments, as examples of the reference signal, a cell reference signal (CRS), a channel state information-reference signal (CSI-RS), and a demodulation reference signal (DMRS) may be used.

Since an ultra-high density network has a plurality of small base stations, when a vehicle having a good channel state with the plurality of small base stations operates as a base station, a plurality of UEs would be likely to have a good channel state.

Accordingly, the small base stations which have estimated the channel state based on the reference signal report the channel state of each new vehicle base station candidate to the macro base station (block 504).

Each new vehicle base station candidate transmits the allocated reference signal to the macro base station. The macro base station estimates the channel state of each new vehicle base station candidate based on the reference signals transmitted from the new vehicle base station candidates (block 505). The macro base station estimates the channel capacity of the backhaul link based on the estimated channel state and estimates the capacity of the access link of each new vehicle base station candidate based on the channel states reported from the small base stations (block 505).

The backhaul link capacity which is the estimated channel capacity of the backhaul link less the data traffic required by each new vehicle base station candidate is defined as $C_b$. The average of the access link capacities of the new vehicle base station candidates which are derived based on the channel states estimated based on the reports from the small base stations is defined as $C_a$.

The macro base station selects the new vehicle base station candidate which maximizes the smaller of Ca and Cb among the new vehicle base station candidates as a new vehicle base station. In other words, the macro base station selects the new vehicle base station candidate which maximizes $min(C_a, C_b)$ among the new vehicle base station candidates as the new vehicle base station (block 506). The macro base station allocates a new small base station ID to the selected new vehicle base station and transfers information about the ambient small base stations for connection with the ambient small base stations. The macro base station requests the selected new vehicle base station to operate as a base station and configures a backhaul link connection.

Figure 6:
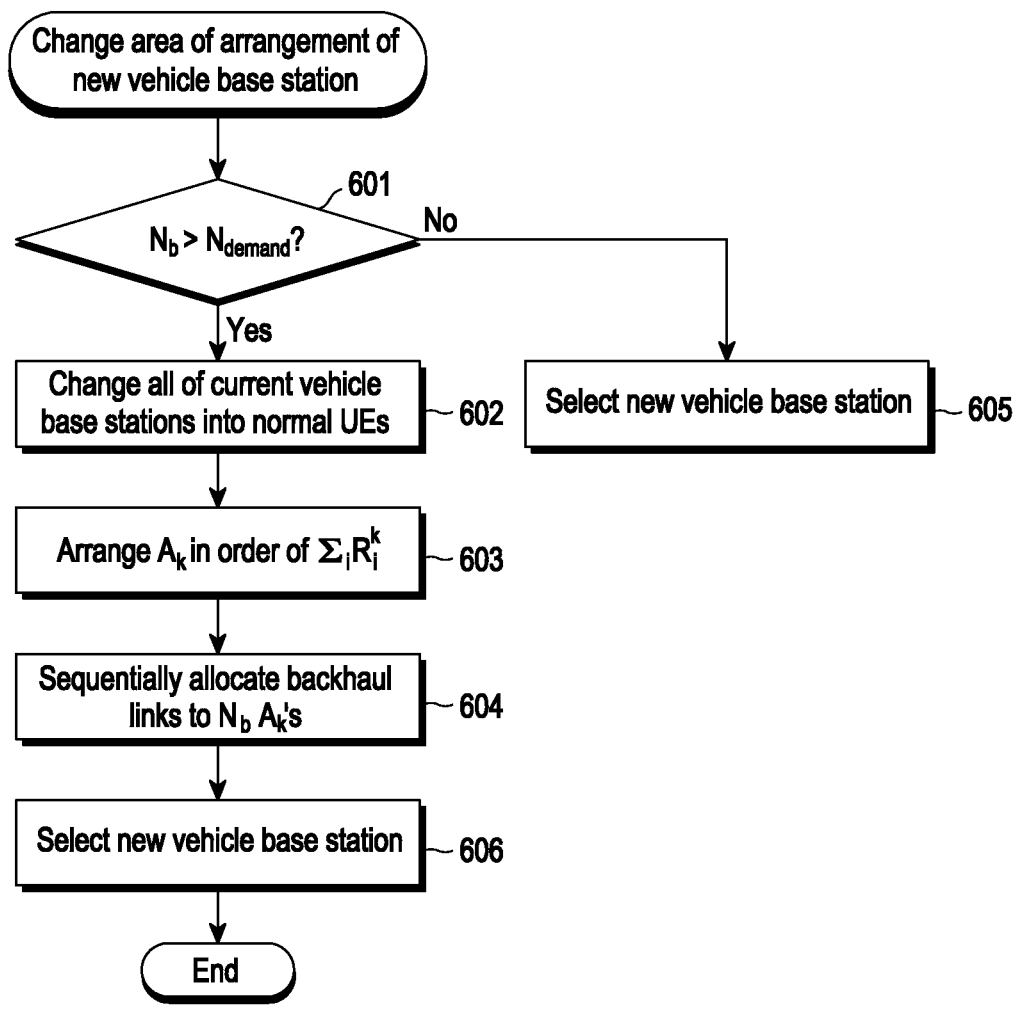
FIG. 6 illustrates operations of an method for changing the area for placing a vehicle base station as part of a method for optimizing an ultra-high density network based on vehicle base stations in a communication system according to certain embodiments.

FIG. 6 illustrates operations of a method for changing the area for placing a vehicle base station in a method for optimizing an ultra-high density network based on vehicle base stations in a communication system according to an embodiment.

Referring to the illustrative example of FIG. 6, a method for changing the area of arrangement of a vehicle base station as illustrated in FIG. 6 is based on the hybrid optimization method and may be a method for changing the area of arrangement of a vehicle base station when the entity to determine network optimization is the macro base station.

When an additional vehicle base station is needed in an area other than areas where a vehicle operating as a small base station, i.e., a vehicle base station, has been allocated, a new vehicle base station is arranged, or an area of arrangement is changed.

As described above, the number of sub service areas in which the sum of the data rates required by UEs gets larger is defined as $N_{demand}$. The number of backhaul links that may be allocated by the macro base station is defined as $N_b$.

The macro base station allocates a new vehicle base station in the sub service area which needs a vehicle base station considering the number of backhaul links that may be allocated, i.e., the number of beams that may be generated, and allocates a backhaul link.

When $N_{demand}$ is smaller than Nb, the macro base station further allocates a backhaul link to the sub service area in which an additional vehicle base station is most needed and selects an additional vehicle base station (block 601).

According to various embodiments, when $N_{demand}$ is larger than Nb, the macro base station changes the area of arrangement of the vehicle base station. In other words, the macro base station changes all of the vehicles currently operating as small base stations into normal UEs (block 602). The macro base station arranges the sub service areas in order from the largest sum of data rates for the UEs included in the sub service areas to the smallest (block 603). For example, when $A_k$ is defined as the k-th sub service area among all the service areas, and $R_i^k$ is defined as the sum of the data rates of UE i present in $A_k$, $A_k$ is arranged in order from the largest $\Sigma R_i^k$ to the smallest. The macro base station arranges the same number of new vehicle base stations as the number of backhaul links ($N_b$) which may be allocated by the macro base station in Ak in order from the largest $\Sigma R_i^k$ to the smallest (block 604). According to various embodiments, as a possible method, the macro base station may arrange them according to the sums of data rates required for the UEs in the sub service areas, operate some of the UEs located in the sub service areas as small base stations, and operate the same number of other small base stations as the number of the UEs operated as small base stations, as normal UEs.

Figure 7:
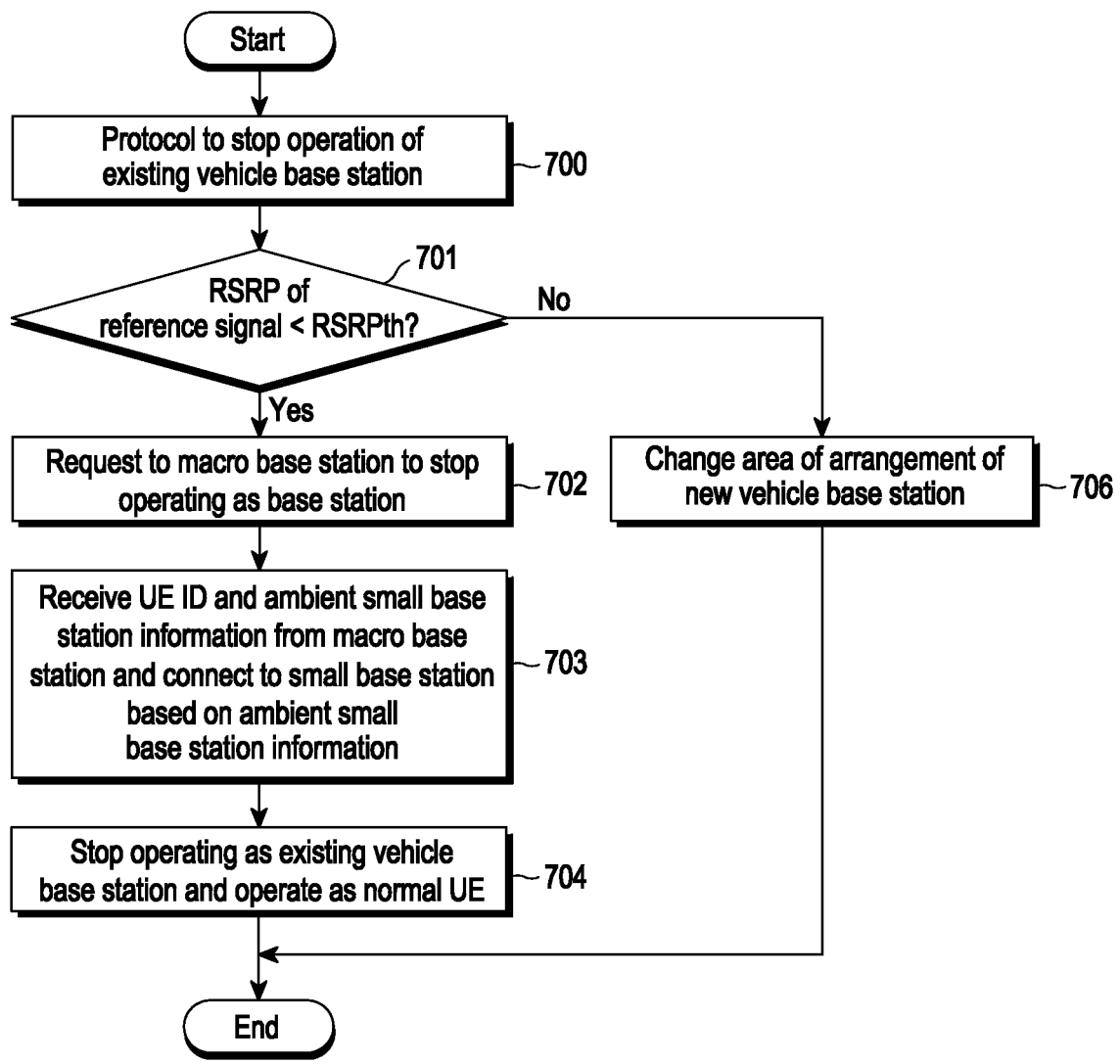
FIG. 7 illustrates operations of an example method for stopping the operation of an existing vehicle base station as part of a method for optimizing an ultra-high density network based on vehicle base stations in a communication system according to some embodiments.

FIG. 7 illustrates operations of an example method for stopping the operation of an existing vehicle base station as part of an overall method for optimizing an ultra-high density network based on vehicle base stations in a communication system according to certain embodiments.

Referring to the illustrative example of FIG. 7, a method for stopping the operation of an existing vehicle as illustrated in FIG. 7 is based on the hybrid optimization method and may be a method for stopping the operation of an existing vehicle when the entity to determine network optimization is the macro base station.

For example, a vehicle currently operating as a small base station initiates a protocol to stop operating as a base station when the quality of the access link between the UEs connected with the vehicle base station and the vehicle base station is deteriorated or the quality of the backhaul link with the macro base station is deteriorated. (block 700) In other words, when the QoS of a specific proportion or specific number of UEs or more among the UEs connected with the vehicle base station is less than a predetermined value, the vehicle base station stops operating as a base station and operates as a normal UE.

As references for measuring the QoS of the UE, the RSRP or signal-to-interference plus noise ratio (SINR) of the reference signal may be used to perform a determination (block 701) of whether to stop a macro base station from operating as a base station or to change an arrangement area of a new vehicle base station. For example, when, at block 701 the RSRP of the actual access links of the connected UEs is determined to be not more than a preset RSRP or when the SINR is not more than a preset SINR, the vehicle base station stops operating as a base station and operates as a normal UE (block 702). When the condition for stopping operating as a base station is found to be satisfied, the vehicle base station sends a request for stopping operating as a base station to the macro base station (block 702). When however, the condition for stopping operating as a base station is not found to be satisfied at block 701, the macro base station allocates a UE ID for allowing the existing vehicle base station to operate as a UE and transmits ambient small base station information, thereby allowing the vehicle base station to connect to the ambient small base stations (block 703). The vehicle base station starts to operate as a normal UE via a new access link connection with the ambient small base stations using the ambient small base station information (block 704).

Figure 8:
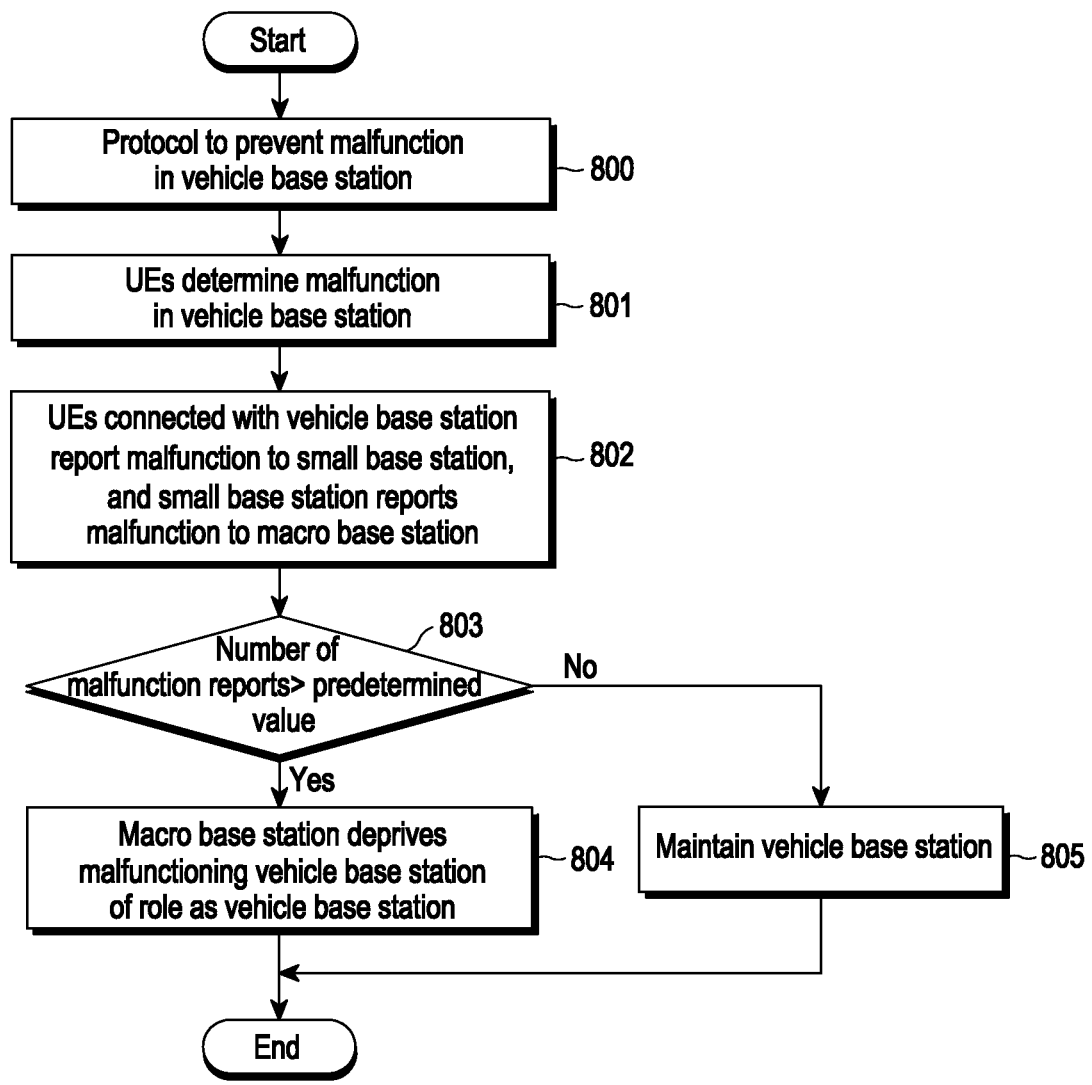
FIG. 8 illustrates operations of an example method for preventing a malfunction in a vehicle base station as part of a method for optimizing an ultra-high density network based on vehicle base stations in a communication system according to various embodiments.

FIG. 8 illustrates operations of an example method for preventing a malfunction in a vehicle base station, as a part of a method for optimizing an ultra-high density network based on vehicle base stations in a communication system according to some embodiments.

Referring to the non-limiting example of FIG. 8, a method for preventing a malfunction in a vehicle base station as illustrated in FIG. 8 is based on the hybrid optimization method and may be a method for preventing a malfunction in a vehicle base station when the entity to determine network optimization is either the macro base station or the vehicle operating as a small base station.

Referring to the illustrative example of FIG. 8, a protocol to prevent a malfunction in a vehicle base station is initiated at block 800. A malfunction in a vehicle base station is defined as follows. Any state in which the vehicle base station continues to operate as a base station although the backhaul link with the macro base station has a preset value or more, but the performance of the access links with the UEs connected with the vehicle base station is deteriorated and the QoS of the multiple UEs is deteriorated is defined as a malfunction in the vehicle base station.

At block 801, the UEs connected with the vehicle base station can determine that the vehicle base station is experiencing a malfunction, by observing one or more of the following conditions: a data rate of the reception from the vehicle base station by the UE connected with the vehicle base station is maintained as less than a predetermined value, the time during which the access link quality measured by each UE is maintained as less than a predetermined value exceeds a predetermined time, the number of occasions where the quality of access link is lower than a predetermined value exceeds a predetermined number. Upon determining the malfunction in the vehicle base station, the UEs report a likelihood of malfunction in the vehicle base station to another small base station, and the small base station reports the likelihood of malfunction in the vehicle base station to the macro base station (block 802). At block 803, the macro base station performs a determination of whether the number of reports to the macro base station exceeds a predetermined number. At block 804 macro base station disconnects the backhaul link with the vehicle base station, if the vehicle base station determined to have a malfunction and deprives the vehicle base station of its role as a base station. If however, at block 803, the macro base station determines that the number of malfunction reports is under a predetermined value, the vehicle base station continues operating as a vehicle base station, as shown by block 805.

According to various embodiments, when the data rate of a specific UE among the data rates of the data transmitted through the backhaul link to the vehicle base station is a predetermined proportion or more, the macro base station determines that the vehicle base station has a malfunction and deprives the vehicle base station as a role as a base station.

Figure 9:
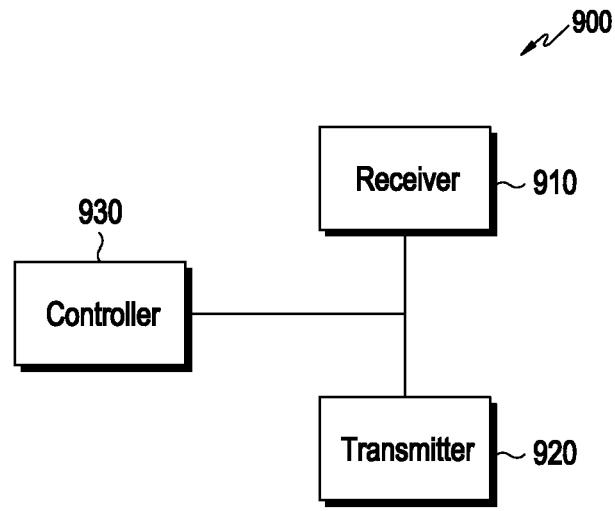
FIG. 9 illustrates, in block diagram format an example of a structure of a base station in a communication system according to various embodiments.

FIG. 9 illustrates, in block diagram format, an example of an internal structure of a base station in a communication system according to some embodiments.

Referring to the non-limiting example of FIG. 9, a base station 900 includes a receiver 910, a transmitter 920, and a controller 930.

The controller 930 controls the overall operation of the base station 900 and controls to perform operations related to, particularly, controlling beam allocation. The operation of controlling beam allocation by the controller 930 is substantially the same as those described above in connection with FIGS. 1 to 8, and no further detailed description thereof is given below.

The receiver 910 receives various messages and information under the control of the controller 930.

The transmitter 920 transmits various messages and information under the control of the controller 930.

Although FIG. 9 illustrates an example in which the receiver 910, the transmitter 920, and the controller 930 are implemented as separate units, at least two of the receiver 910, the transmitter 920, and the controller 930 may be integrated into one. The receiver 910, the transmitter 920, and the controller 930 may be implemented as at least one processor.

Figure 10:
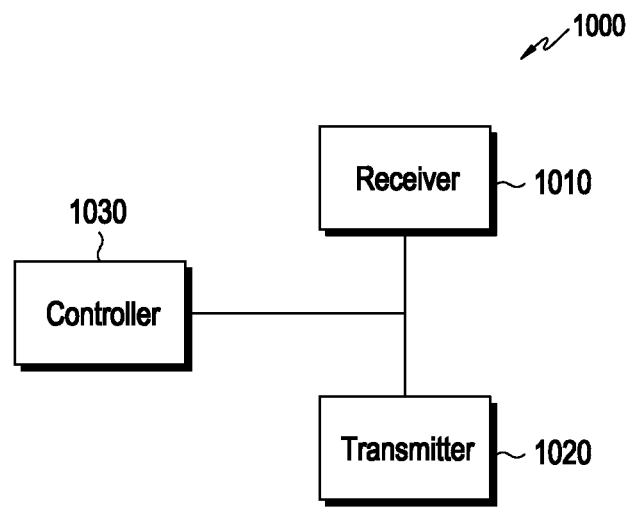
FIG. 10 illustrates, in block diagram format an example of a structure of a UE in a communication system according to some embodiments.

FIG. 10 illustrates, in block diagram format, an example of an internal structure of a UE in a communication system according to an embodiment.

Referring to the illustrative example of FIG. 10, a UE 1000 includes a receiver 1010, a transmitter 1020, and a controller 1030.

The controller 1030 controls the overall operation of the UE 1000 and controls to perform operations related to, particularly, controlling beam allocation. The operation of controlling beam allocation-related operations by the controller 1030 is substantially the same as those described above in connection with FIGS. 1 to 8, and no further detailed description thereof is given below.

The receiver 1010 receives various messages and information under the control of the controller 1030.

The transmitter 1020 transmits various messages and information under the control of the controller 1030.

Although FIG. 10 illustrates an example in which the receiver 1010, the transmitter 1020, and the controller 1030 are implemented as separate units, at least two of the receiver 1010, the transmitter 1020, and the controller 1030 may be integrated into one. The receiver 1510, the transmitter 1020, and the controller 1030 may be implemented as at least one processor.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may be accessed by the device that performs embodiments of the disclosure via an external port. A separate storage device over the communication network may be accessed by the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

As is apparent from the foregoing description, according to the embodiments, it is possible to efficiently operate base stations in a wireless communication system.

According to certain embodiments, it is possible to enable a vehicle to operate as both a base station and a UE in a communication system.

According to various embodiments, it is possible to design an ultra-high density network using vehicle-based mobile base stations in a communication system.

According to some embodiments, it is possible to increase the quality of service (QoS) of each UE using a design of an ultra-high density network in a communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first base station (BS) in a wireless communication system, the method comprising:
   receiving, from each of at least one second BS, a message including information related to a sum of traffic loads of a plurality of user equipment (UEs) and information related to a location;
   identifying a sum of traffic loads transmitted from a plurality of second base stations (BSs) to the UEs, the second BSs being located in a first area within a service area of the first BS;
   identifying whether the identified sum of the traffic loads is larger than a sum of data rates for the UEs of the second BSs located in the first area;
   in a case that the identified sum of the traffic loads is larger than the sum of the data rates, identifying a UE of the plurality of UEs as a specific UE to perform a second BS operation; and
   transmitting, to the specific UE, information indicating that the UE is to be operated as the specific UE.

2. The method of claim 1, wherein the second BSs communicate directly with the first BS via a backhaul link, and
   wherein, in a case where UEs of the plurality of UEs do not perform the second BS operation, communicating, by each of the UEs of the plurality of UEs to with the second BSs via an access link according to a normal mode of UE operation.

3. The method of claim 1, wherein identifying the UE as the specific UE to perform the second BS operation includes:
   selecting candidate UEs from among the UEs of the second BSs;
   allocating a reference signal identification (ID) and a frequency and time resource to each of the candidate UEs;
   transmitting first information related to the reference signal ID allocated to the candidate UEs to the second BSs;
   receiving a reference signal from each of the candidate UEs;
   estimating a channel state between each of the candidate UEs and the first BS based on the reference signal received from each of the candidate UEs;
   estimating a backhaul link capacity and access link capacity for each of the candidate UEs based on the channel state estimated for each of the candidate UEs; and
   selecting the specific UE based on the backhaul link capacities and the access link capacities estimated for the candidate UEs.

4. The method of claim 3, wherein selecting the specific UE based on the backhaul link capacities and access link capacities estimated for the candidate UEs includes:
   identifying a first backhaul link capacity, which is a backhaul link capacity estimated for the candidate UEs except for data traffic required by the candidate UEs and a first access link capacity which is an average of the access link capacities estimated for the candidate UEs; and
   selecting a candidate UE among the candidate UEs which maximizes a minimum value of the first backhaul link capacity and the first access link capacity as the specific UE.

5. The method of claim 1, further comprising:
   in a case where a number of backhaul links which can be allocated by the first BS is less than a number of possible areas within the service area of the first BS, selecting at least one BS to operate in a normal UE operation mode; and
   transmitting, to the at least one second BS, information indicating that the at least one second BS is to be operate in the normal UE operation mode.

6. The method of claim 5, wherein selecting the at least one second BS to operate in the normal UE operation mode comprises:
   identifying a sum of data rates required by UEs located in each of the possible areas within the service area of the first BS; and
   transmitting information indicating that at least one of the UEs located in the possible areas within the service area of the first BS are to operate as the specific UE and that at least one specific second BSs is to operate in the normal UE operation mode based on the sums of the data rates required by the UEs located in each of the possible areas within the service area of the first BS.

7. The method of claim 1, further comprising:
   in a case that the second BSs include the second BS receiving data above a threshold data amount during a threshold time, identifying second BSs receiving data below the threshold data amount during the threshold time as malfunctioning second BSs; and
   transmitting information indicating that the second BS receiving data above the threshold data amount during the threshold time is to communicate with the other second BSs via an access link according to a normal mode of UE operation.

8. The method of claim 1, further comprising:
   receiving, from a second BS of the plurality of BSs at a number of times exceeding a threshold number, information indicating that a second BS has a malfunction;
   identifying the second BS of the plurality of second BSs as a malfunctioning second BS based on receiving the information indicating the malfunction in excess of the threshold number; and
   transmitting, to the second BS indicated as malfunctioning, a request to operate in a normal mode of UE operation, by communicating with other second BSs via an access link.

9. A method performed by a user equipment (UE) in a wireless communication system, the method comprising:
   in case that a specific second base station (BS) among second BSs connected with the UE meets a predefined condition, identifying the specific second BS as a malfunctioning second BS; and
   transmitting information indicating that the specific second BS is the malfunctioning second BS to a second BS other than the specific second BS among the second BSs, wherein the predefined condition includes a condition where a data rate of data received by the UE through the specific second BS is less than a threshold.

10. The method of claim 9, wherein the predefined condition further includes a condition in which a time during which an access link quality measured by the UE is maintained as less than a threshold access link quality exceeds a threshold time.

11. A first base station (BS) in a communication system, the first BS comprising:
a controller configured to:
identify a sum of traffic loads transmitted from at least one second BS to a plurality of user equipment (UEs), the at least one second BSs being located in an area among areas included in a service area of the first BS,
identify whether the identified sum of the traffic loads is larger than a sum of data rates for the UEs of the second BSs located in a first area, and
in a case that the identified sum of the traffic loads is larger than the sum of the data rates, identify a UE among the plurality of UEs to operate as a second BS; and
a transceiver configured to:
receive, from each of second BS, a message including information related to a sum of traffic loads of the UEs and information related to a location, and
transmit, to a UE in the location, information indicating that the UE is to operate in a normal mode of UE operation.

12. The first BS of claim 11, wherein
the second BSs directly communicate with the first BS via a backhaul link, and wherein,
in a case that UEs of the plurality of UEs do not operate as the second BS, the UEs operate in the normal mode of UE operation and communicate with second BSs via an access link.

13. The first BS of claim 11, wherein
the controller is configured to:
select candidate UEs from among the UEs operating as second BSs,
estimate a channel state between each of the candidate UEs and the first BS based on a reference signal received from each of the candidate UEs, and
select a specific UE based on backhaul link capacities and access link capacities estimated for the candidate UEs, and,
wherein the transceiver is configured to:
allocate a reference signal identification (ID) and a frequency and time resource to each of the candidate UEs,
transmit first information related to the reference signal ID allocated to the candidate UEs to the second BSs and receive a reference signal from each of the candidate UEs.

14. The first BS of claim 13, wherein the controller is configured to:
identify a first backhaul link capacity, comprising a backhaul link capacity estimated for the candidate UEs except for data traffic required by the candidate UEs, and
identify a first access link capacity comprising an average of the access link capacities estimated for the candidate UEs, and
select a candidate UE among the candidate UEs which maximizes a minimum value of the first backhaul link capacity and the first access link capacity as the specific UE.

15. The first BS of claim 11, wherein the controller is further configured to:
select the at least one second BS from among the second BSs to operate in a normal mode of UE operation, in a case that a number of backhaul links which can be allocated by the first BS is less than a threshold number of areas, and
wherein the transceiver is configured to:
transmit, to the at least one second BS, information indicating that the at least one second BS is to operate in the normal mode of UE operation.

16. The first BS of claim 15, wherein
the controller is configured to:
identify a sum of data rates required by UEs located in each area within the service area of the first BS while selecting the at least one second BS to operate in the normal mode of UE operation, and
wherein the transceiver is configured to:
transmit information indicating that at least one of the UEs located in each of the areas within the service area of the first BS is to operate as a specific UE and that at least one of the second BSs is to operate in the normal mode of UE operation based on sums of data rates required by the UEs located in each of the areas in the service area of the first BS.

17. The first BS of claim 11, wherein the controller is configured to:
identify an other second BS receiving data below a threshold data amount during a threshold time as a malfunctioning second BS, and wherein
the transceiver is configured to:
transmit information indicating that the other second BS is to operate in the normal mode of UE operation by communicating with specific second BSs via an access link.

18. The first BS of claim 11, wherein the controller is configured to:
upon receiving from at least one second BS, a threshold number of times or more, information indicating that an other second BS has a malfunction, identify the other second BS as a malfunctioning second BS, and
wherein, the transceiver is configured to:
receive, a threshold number of times or more, information indicating that the other second base station is the malfunctioning second BS, and
transmit, to the other second BS, information indicating that the other second BS is requested to operate in a normal mode of UE operation by communicating with other second BSs via an access link.

19. A user equipment (UE) in a communication system, the UE comprising:
a controller configured to, in case that a specific second base station (BS) among second BSs connected with the UE meets a predefined condition, identify the specific second BS as a malfunctioning second base station; and
a transceiver configured to transmit information indicating that the specific second BS is the malfunctioning second BS to a second BS other than the specific second BS among the second BSs, wherein
the predefined condition includes a condition where a data rate of data received by the UE through the specific second BS is less than a threshold.

20. The UE of claim 19, wherein the predefined condition further includes a condition in which a time during which an access link quality measured by the UE is maintained as less than an access threshold link quality exceeds a threshold time.

* * * * *